United States Patent [19]

Kim

[11] Patent Number: 5,765,111
[45] Date of Patent: Jun. 9, 1998

[54] SELECTIVE MOBILE STATION CALLING METHOD FOR DIGITAL CORDLESS TELEPHONE AND SYSTEM

[75] Inventor: Kyou-Woong Kim, Seoul, Rep. of Korea

[73] Assignee: SamSung Electronics Co., Ltd., Suwon, Rep. of Korea

[21] Appl. No.: 676,409

[22] Filed: Jul. 8, 1996

[30] Foreign Application Priority Data

Jul. 6, 1995 [KR] Rep. of Korea .................. 1995-19788

[51] Int. Cl.$^6$ ............................................. H04M 11/00
[52] U.S. Cl. ................................. 455/462; 455/461
[58] Field of Search ............................. 379/58, 61, 63; 455/89, 560, 575, 461, 465, 515

[56] References Cited

U.S. PATENT DOCUMENTS 5,379,339 1/1995 Sakamoto .................. 455/461
5,418,840 5/1995 Le Bastard ................. 455/568

FOREIGN PATENT DOCUMENTS 554625   8/1993  United Kingdom .......... 379/106
WO 92/02099  2/1992  WIPO ...................... 379/104

Primary Examiner—Dwayne Bost
Assistant Examiner—Myron K. Wyche
Attorney, Agent, or Firm—Robert E. Bushnell, Esq.

[57] ABSTRACT

A method and apparatus for selectively calling a mobile station by generating a ring signal at only a selected mobile station from among a plurality of mobile stations registered with a private base station. A ring signal is transmitted to only the selected mobile station so that an external subscriber of a public switched telephone network (PSTN) can communicate with a subscriber of the selected mobile station.

18 Claims, 5 Drawing Sheets

SELECTIVE MOBILE STATION CALLING METHOD FOR DIGITAL CORDLESS TELEPHONE AND SYSTEM

CROSS-REFERENCE TO RELATED APPLICATIONS

This application makes reference to, incorporates the same herein, and claims all benefits accruing under 35 U.S.C. §119 from an application for Selective Mobile Station Calling Method For Digital Cordless Telephone And Apparatus Thereof earlier filed in the Korean Industrial Property Office on 6 Jul. 1995 and there assigned Serial No. 19788/1995.

BACKGROUND OF THE INVENTION

The present invention relates to a digital cordless telephone, and more particularly, to a method and apparatus for selectively calling a mobile station by generating a ring signal at only a selected mobile station among a plurality of mobile stations registered to a private base station.

With the development of mobile communication technology, digital cordless telephones have become increasingly popular. A second generation digital cordless telephone (hereinafter "CT2") allows communication within two hundred meters from where a cordless public base station is installed, such as a telepoint. The CT2 includes multiple handsets and a private base station, like conventional cordless telephones CT0 and CT1. It also includes a public base station that is based on the concept of a cell. The private base station is wire connected with a public switched telephone network (hereinafter "PSTN"). When an incoming call is produced from the PSTN, a ring signal is transmitted to all mobile stations handsets registered to the private base station. Conventionally, ten mobile stations can be registered to a single private base station. Therefore, when an incoming call is received, the private base station transmits the ring signal to all ten mobile stations. Since the incoming call is intended for only one of the mobile stations however, a problem arises in that the subscribers corresponding to the other mobile stations are unnecessarily inconvenienced. The present invention is directed towards an apparatus and method for solving this problem.

SUMMARY OF THE INVENTION

Therefore, it is an object of the present invention to provide an improved digital cordless telephone and process for operationally controlling communications via digital cordless telephone.

It is another object to provide a method and apparatus for calling only the subscriber of a selected mobile station among a plurality of mobile stations registered to a private base station.

It is yet another object to provide a method and apparatus for generating a ring signal at only a selected mobile station when an incoming call is generated from a PSTN.

It is still another object to provide a method and apparatus for automatically performing a hook-off operation when an incoming signal is received from a PSTN, recognizing a dual tone multi-frequency (hereinafter "DTMF") signal, and virtually generating a ring signal.

It is still yet another object to provide a method and apparatus for setting a base station to operate in a selective mobile station calling mode in response to a supervisory request message transmitted to the base station from a mobile station.

To achieve these and other objects, the present invention provides a selective mobile station calling method for a private base station by automatically performing an off-hook operation when an incoming call is generated from a PSTN that is cable connected to the base station, generating a slot number request tone or a slot number request voice to request a calling subscriber to input the slot number of a desired mobile station; and transmitting a ring signal only to the mobile station corresponding to the slot number input by the calling subscriber.

The present invention further provides a private base station for a digital cordless telephone with a line interface for receiving an incoming call generated from a PSTN and performing a hook-off operation in response to receiving the incoming call. A tone generator generates a slot number request tone; a voice guide generates a slot number request voice; a tone detector detects the slot number input in response to the slot number request tone or the slot number request voice; and a controller transmits a ring signal by polling only the mobile station corresponding to the slot number detected by the tone detector.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE PREFERRED EMBODIMENT

Figure 1:
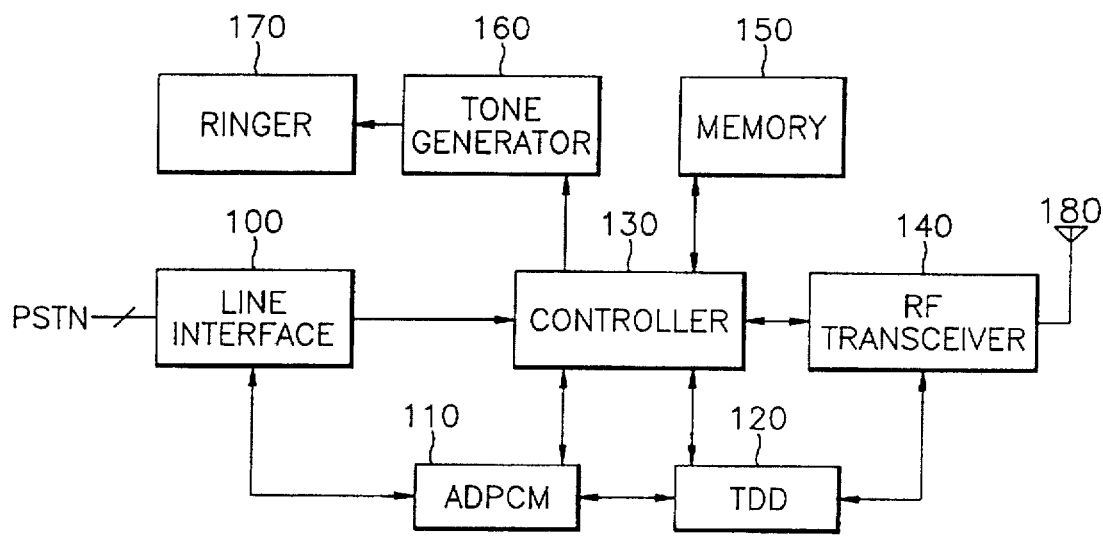
FIG. 1 is a block diagram of a private base station for a general digital cordless telephone.
Figure 2:
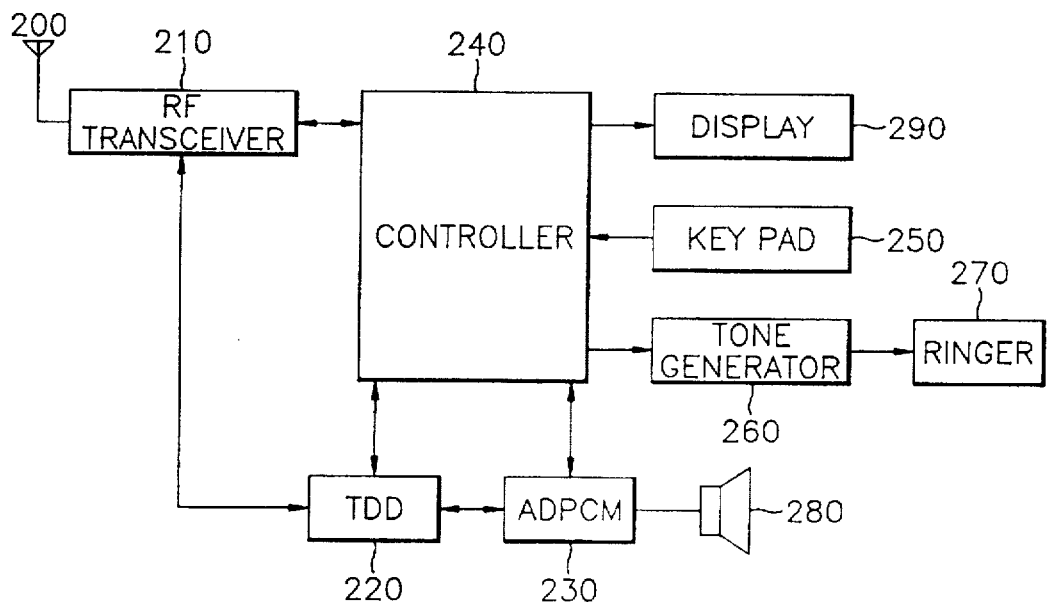
FIG. 2 is a block diagram of a mobile station for a general digital cordless telephone that can be used in the practice of present invention.

Turning now to the drawings and referring to FIG. 1, a block diagram of a private base station for a general digital cordless telephone is shown. When an incoming call is received from a PSTN, the private base station of FIG. 1 transmits a ring signal to a mobile station constructed as shown in FIG. 2, in accordance with a protocol shown in FIG. 3, and enables performance of a communication mode. The private base station of FIG. 1 includes: a line interface 100, an adaptive differential pulse code modulation (hereinafter "ADPCM") processor 110, a time division duplex (hereinafter "TDD") processor 120, a controller 130, a radio frequency (hereinafter "RF") transceiver 140, a memory 150, a tone generator 160, a ringer 170 and an antenna 180. The mobile station of FIG. 2 may be constructed with an antenna 200, an RF transceiver 210, a TDD processor 220, an ADPCM processor 230, a controller 240, a key pad 250, a tone generator 260, a ringer 270, a speaker 280 and a display unit 290.

Figure 3:
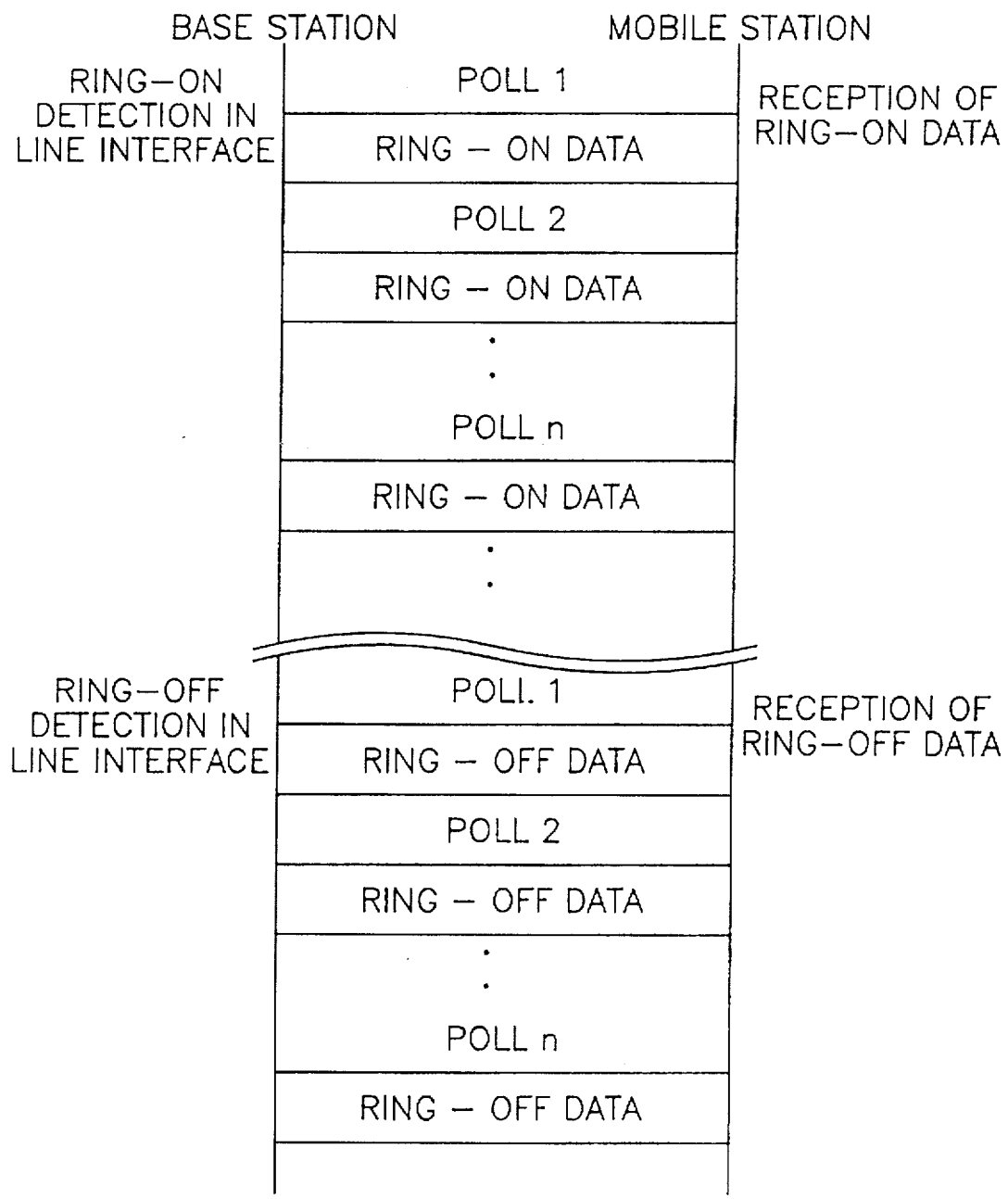
FIG. 3 shows a general protocol for ring signal generation.

First, the operation of transmitting a ring signal will be described. When an incoming call is received from the PSTN, line interface 100 of the private base station provides a line signal from the PSTN, and controls off-hook and on-hook operations. During this time, when a ring signal is detected from line interface 100, controller 130 controls TDD processor 120 so that ring data is generated according to the specifications of a CT2-common air interface (hereinafter "CAI"). The generated ring data is transmitted to antenna 180 via RF transceiver 140. RF transceiver 210 of the mobile station receives the ring data via antenna 200. TDD processor 220 of the mobile station separates control data from the received ring data. In response to the control data, controller 240 controls tone generator 260 to generate a tone to be transmitted to ringer 270 as a ring signal. In other words, when an incoming call is received from the PSTN, the base station supplies ring data to the mobile station, thereby allowing a ring signal to be generated in the mobile station. FIG. 3 shows a protocol illustrating how the base station allows a ring signal to be generated in a plurality of mobile stations. Referring to FIG. 3, when a ring signal is detected from line interface 100 of the base station, controller 130 sequentially polls all of the mobile stations using identification numbers of the respective mobile stations registered in memory 150. During this time, a ring cadence coincides with the ring signal detected from line interface 100, and the corresponding ring on/off control data is transmitted to the mobile stations. Controller 240 of each of the mobile stations analyzes the transmitted data, and when the data analyzed corresponds to the identification number of the respective mobile station, allows the ring signal to be transmitted to ringer 270 based on the ring on/off control data.

Next, the operation for establishing a communication mode after the ring signal is transmitted to ringer 270 will be described.

Ringer 270 generates an audible ring in response to the ring signal. In response to the audible ring, a subscriber of multiple mobile stations can depress a predetermined button on key pad 250 to establish a communication mode between the base station and mobile station. In other words, if a subscriber presses a predetermined button on key pad 250 in response to the audible ring, controller 240 controls TDD processor 220 to allow control data based on the CT2-CAI specification to be generated. The generated data is then transmitted to the base station via RF transceiver 210 and antenna 200.

The data transmitted from the mobile station is received by RF transceiver 140 of the base station via antenna 180. The control data is separated by TDD processor 120 to then be applied to controller 130. Controller 130 controls a hook-controller of line interface 100 to perform an off-hook operation, and allows a line signal provided from the PSTN to be applied to ADPCM processor 110. The line signal from the PSTN is converted into digital data by ADPCM processor 110. The converted digital data is processed together with the control data by TDD processor 120, and then is transmitted to the mobile station via RF transceiver 140 and antenna 180.

The data transmitted from the base station in accordance with the CT2-CAI specification is received by RF transceiver 210 of the mobile station via antenna 200. The received data is separated into voice data and control data by TDD processor 220. The control data is transmitted to controller 240, and the voice data is transmitted to speaker 280 via ADPCM processor 230. Through this process, a subscriber placing an incoming call through the PSTN is able to communicate with a subscriber of the mobile station.

As described above, however, when an incoming call is generated from the PSTN, the private base station conventionally transmits a ring signal to all mobile stations. Accordingly, a problem arises in that it is difficult to call a subscriber corresponding to only a specific mobile station.

In explaining the present invention below, detailed descriptions of well-known functions or components related to the invention have been omitted in order to not obscure the present invention.

Figure 4:
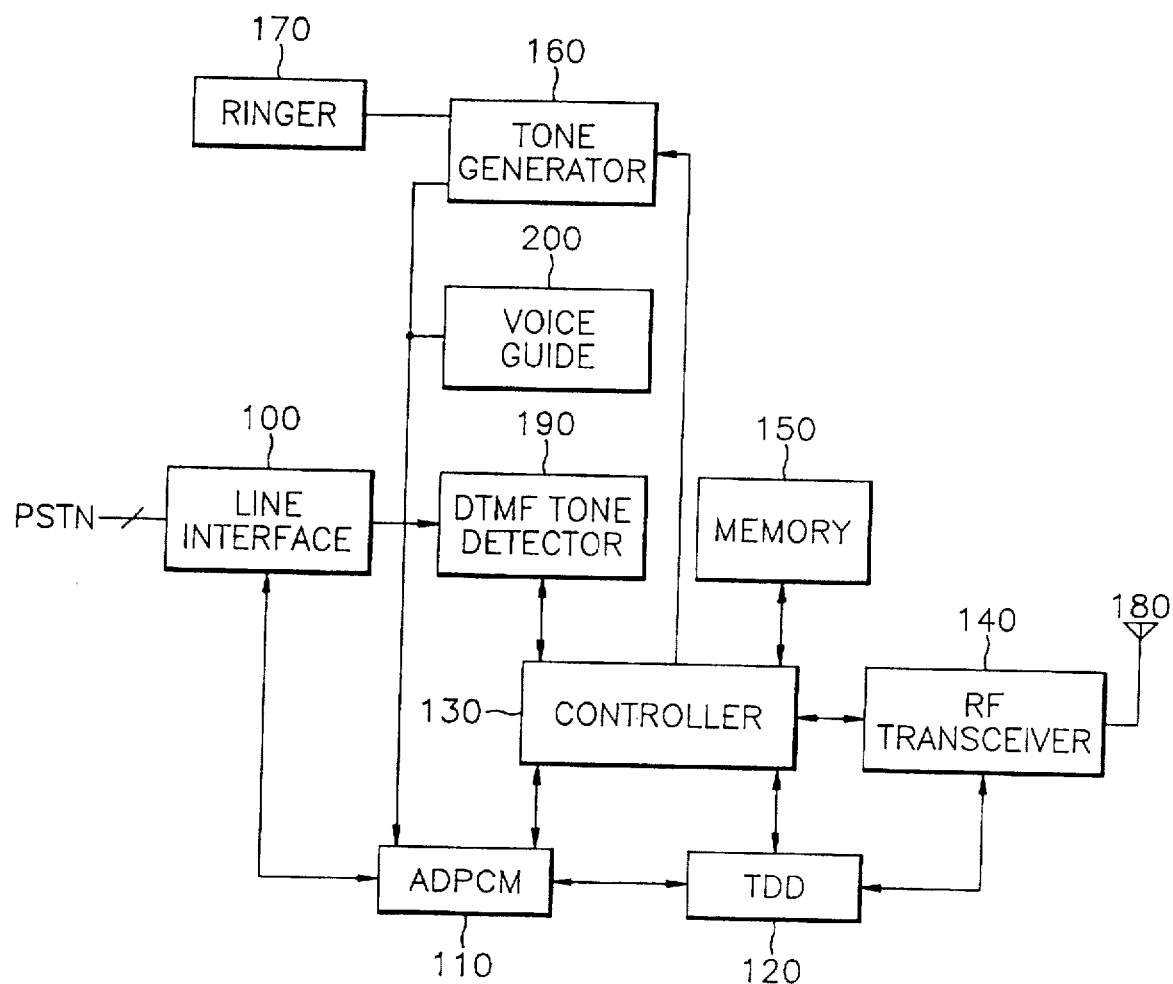
FIG. 4 is a block diagram of a private base station for a digital cordless telephone constructed according to the principles of the present invention.
Figure 5:
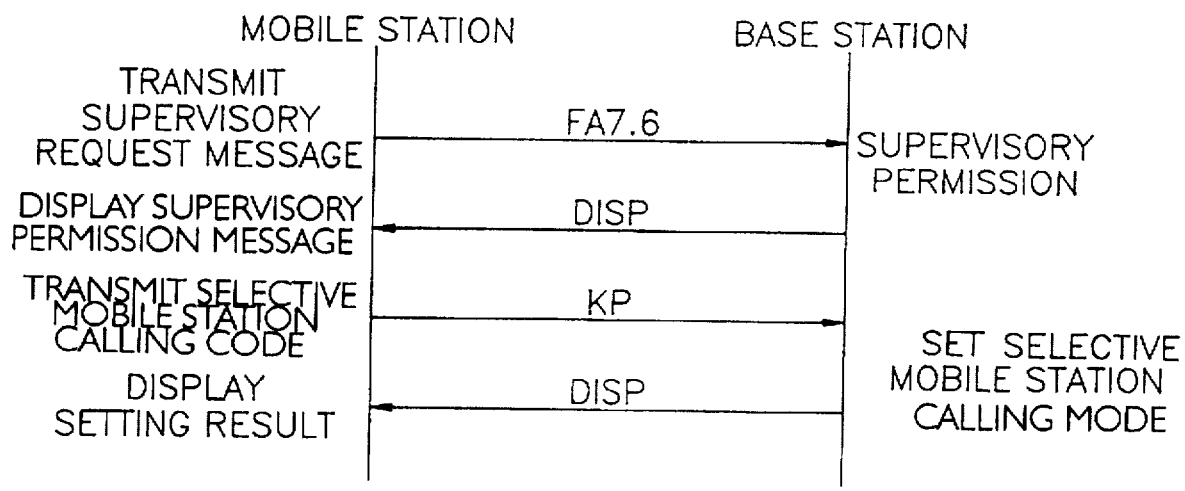
FIG. 5 shows a protocol for setting a selective mobile station calling mode according to the principles of the present invention.
Figure 6:
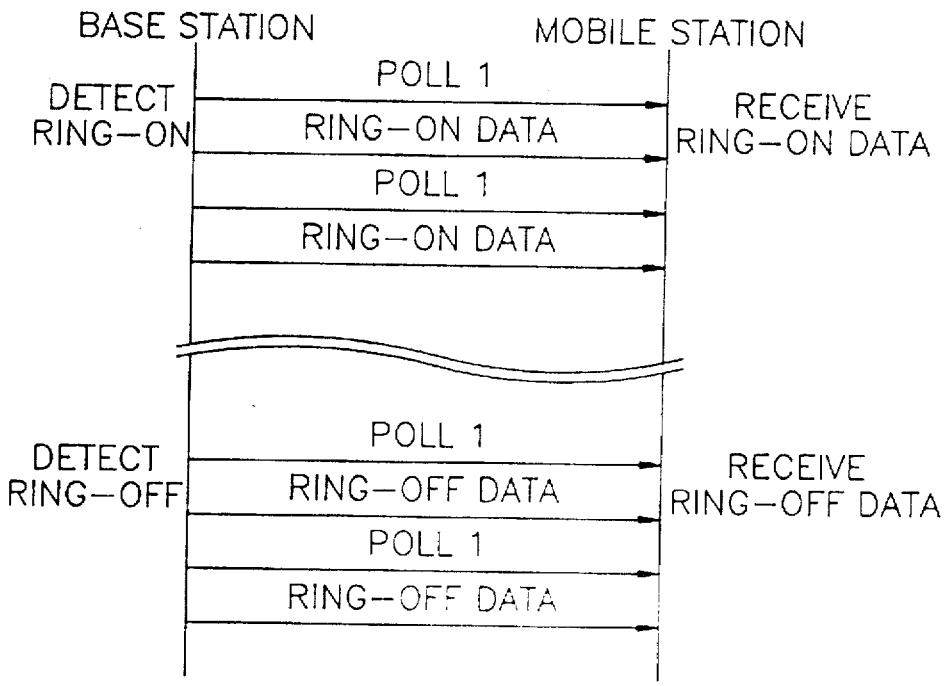
FIG. 6 shows a protocol for ring signal generation according to the principles of the present invention.

Referring to FIG. 4, a private base station for a digital cordless telephone constructed according to the principles of the present invention includes all of the components shown in the base station of FIG. 1, but further includes a DTMF tone detector 190 and a voice guide 200. FIG. 5 shows a protocol for setting a selective mobile calling mode according to the principles of the present invention.

Referring FIG. 5, if a subscriber of a mobile station sets a selective mobile station calling mode using key pad 250, controller 130 of the mobile station transmits a corresponding supervisory request message FA7.6 to the base station, and controller 240 of the base station analyzes the transmitted message FA7.6. If the message is properly received and recognized, supervisory permission is granted and a supervisory permission message is transmitted for display DISP to the mobile station in a supervisory mode. Controller 240 of the mobile station then displays on display 290, the supervisory permission message together with a message requesting that a code corresponding to the selective mobile station calling mode (i.e., a selective mobile station calling code) be input. At this time, if the subscriber enters the selective mobile station calling code via key pad 250, controller 240 of the mobile station transmits a code KP to the base station, and controller 130 of the base station stores the transmitted code KP in memory 150, thereby setting the selective mobile station calling mode. Finally, a message for display DISP is transmitted to the mobile station to inform the subscriber that the selective mobile station calling mode has been set.

After the base station is set to operate in the selective mobile station calling mode, the selective mobile station calling mode can executed. A description of this process will now be provided with reference to FIGS. 2 and 4 through 7.

Figure 7:
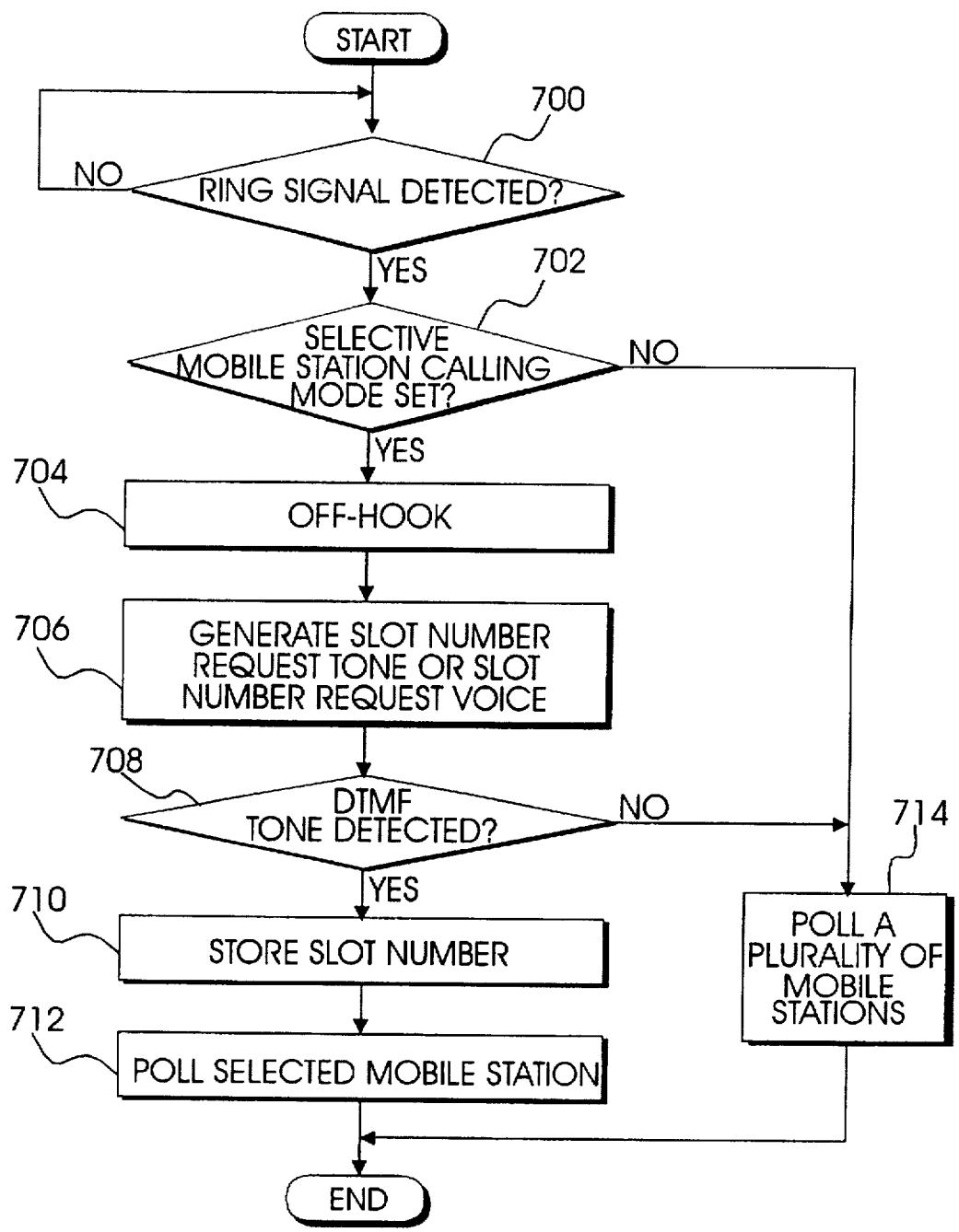
FIG. 7 is a flowchart showing the process of a selective mobile station calling mode according to the principles of the present invention.

In step 700 of FIG. 7, controller 130 of the base station determines whether a ring signal is detected in line interface 100. After the ring signal is detected, a determination is made, in step 702, as to whether the selective mobile station calling mode has been previously set by reading data stored in memory 150. If it is determined that the selective mobile station calling mode has been set, controller 130 of the base station controls line interface 100 to automatically perform an off-hook operation in step 704. In step 706, a slot number request tone generated via tone generator 160 or a slot number request voice generated via voice guide 200 is transmitted to the subscriber initiating the incoming call. In response, if the subscriber who initiated the call inputs the slot number of a desired mobile station using dialing key pad, DTMF tone detector 190 detects the slot number as a DTMF tone, in step 708, and the identified result is provided to controller 130 of the base station.

In step 710, controller 130 of the base station temporarily stores the input slot number of the mobile station in memory 150. Then, in step 712, ring-on-data is virtually generated according to the protocol shown in FIG. 6 to poll the selected mobile station. In other words, controller 130 of the base station assumes that only one slot is registered and polls the selected mobile station. At this time, the polling operation of the mobile station is performed with respect to a only single mobile station, in contrast to a conventional base station that polls all of the mobile stations.

If the slot number of the mobile station is not detected within the predetermined time by DTMF tone detector 190 in step 708, controller 130 of the base station polls all mobile stations registered to the base station, in step 714.

As described above, by the polling operation of the base station, controller 240 of the mobile station controls tone generator 260 to generate a tone. The generated tone is transmitted via ringer 270 as a ring signal. At this time, if the subscriber depresses a predetermined button, controller 130 of the base station enables performance of the communication mode.

According to the present invention, since a ring signal is transmitted to only a selected mobile station, an external subscriber of a PSTN can communicate with a subscriber of a desired mobile station among a plurality of mobile stations registered with a private base station.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A method for controlling communications via a cordless mobile telephone system comprising a private base station connected to a public switched telephone network and a plurality of mobile units registered to said private base station, said method comprising the steps of:

receiving, at said private base station, an incoming call from said public switched telephone network;

automatically performing a hook-off operation in response to receipt of said incoming call from said public switched telephone network;

requesting a subscriber placing said incoming call, via said public switched telephone network, to select a mobile unit from said plurality of mobile units registered to said private base station by inputting a slot number corresponding to a selected mobile unit; and transmitting a ring signal to said selected mobile unit from said plurality of mobile units in response to input of said slot number by said subscriber.

2. The method of claim 1, further generating one of a slot number request tone signal and a slot number request voice signal to request the subscriber placing said incoming call, via said public switched telephone network, to input the slot number corresponding to said selected mobile unit registered to said private base station, after the hook-off operation is performed.

3. The method of claim 1, further identifying said slot number input by said subscriber by detecting a dual tone multi-frequency signal corresponding to said slot number from said public switched telephone network.

4. The method of claim 3, further storing said slot number in a memory unit of said private base station after said slot number has been identified from said public switched telephone network.

5. A method for controlling communications via a cordless telephone system comprising a base station connected to a public switched telephone network and a plurality of mobile units registered to said base station, said method comprising the steps of:

receiving, at said base station, an incoming call from said public switched telephone network;

determining whether a selective calling mode of said base station has been set after a ring signal indicative of said incoming call is received from said public switched telephone network;

automatically performing a hook-off operation in response to determining that said selective calling mode of said base station has been set;

requesting a subscriber placing said incoming call, via said public switched telephone network, to select a mobile unit from said plurality of mobile units registered to said base station by inputting a slot number corresponding to a selected mobile unit; and transmitting said ring signal to only said selected mobile unit from among said plurality of mobile units in response to input of said slot number by said subscriber.

6. The method of claim 5, further generating one of a slot number request tone signal and a slot number request voice signal to audibly request the subscriber placing said incoming call, via said public switched telephone network, to input the slot number corresponding to said selected mobile unit registered to said base station, after the hook-off operation is performed.

7. The method of claim 6, further identifying said slot number input by said subscriber by detecting a dual tone multi-frequency signal corresponding to said slot number from said public switched telephone network.

8. The method of claim 7, further storing said slot number in a memory unit of said base station after said slot number has been identified from said public switched telephone network.

9. A selective mobile station calling apparatus of a base station connected to a telephone network for facilitating communications with a plurality of mobile units registered to said base station, said selective mobile station calling apparatus comprising:

a line interface for receiving an incoming call from said telephone network, and performing a hook-off operation in response to receipt of said incoming call;

a tone generator for generating a slot number request tone requesting a subscriber placing said incoming call, via said telephone network, to select a mobile unit from said plurality of mobile units registered to said base station by inputting a slot number corresponding to a selected one of said plurality of mobile units registered to said base station;

a voice guide for generating a slot number request voice requesting said subscriber placing said incoming call, via said telephone network, to select a mobile unit from said plurality of mobile units registered to said base station by inputting said slot number corresponding to said selected one of said plurality of mobile units registered to said private base station;

a tone detector for detecting said slot number provided by said subscriber in response to one of said slot number request tone and said slot number request voice; and a controller for transmitting a ring signal to said selected one of said plurality of mobile units registered to said private base station in response to said slot number detected by said tone detector.

10. The selective mobile station calling apparatus of claim 9, further comprised of said tone detector determining whether said slot number is provided by said subscriber.

11. The selective mobile station calling apparatus of claim 9, further comprising a memory for storing said slot number provided by said subscriber.

12. The selective mobile station calling apparatus of claim 10, further comprising a memory for storing said slot number provided by said subscriber.

13. A method for setting an operating mode of a private base station of a cordless telephone system operable with a plurality of mobile units registered at said private base station, said method comprising the steps of:

transmitting a supervisory request message to said private base station connected to a public switched telephone network from a selected one of said plurality of mobile units;

transmitting a supervisory permission message to said selected one of said plurality of mobile units from said private base station in response to said supervisory request message;

transmitting a code corresponding to a selective mobile station calling mode of said private base station to said private base station from said selected one of said plurality of mobile units in response to said supervisory permission message; and setting said operating mode of said private base station to said selective mobile station calling mode by storing said code transmitted to said private base station from said selected one of said plurality of mobile units for enabling said private base station set in said selective mobile station calling mode to call only said selected one of said plurality of mobile units when an incoming call is received from said public switched telephone network.

14. The method of claim 13, further comprising a step of transmitting a resulting message to said one of said plurality of mobile units from said private base station to indicate that said operating mode of said private base station has been set to said selective mobile station calling mode.

15. A method for controlling communications of a cordless mobile telephone system comprising a base station connected to a telephone network and a plurality of mobile units registered to said base station, said method comprising the steps of:

detecting when a ring signal indicative of an incoming call is received at said base station, via said telephone network;

determining whether said base station has been set to operate in a selective mobile station calling mode after receipt of said ring signal;

performing an off-hook operation in response to determining that said base station has been set to operate in said selective mobile station calling mode;

requesting a subscriber placing said incoming call, via said telephone network, to select a mobile unit from among said plurality of mobile units registered to said base station by inputting a slot number corresponding to a selected mobile unit; and transmitting said ring signal to said selected mobile unit from among said plurality of mobile units registered to said base station in response to input of said slot number by said subscriber.

16. The method of claim 15, further generating one of a slot number request tone signal and a slot number request voice signal to audibly request the subscriber placing said incoming call, via said telephone network, to input the slot number corresponding to said selected mobile unit registered to said base station, after the hook-off operation is performed.

17. The method of claim 15, further identifying said slot number input by said subscriber by detecting a dual tone multi-frequency signal corresponding to said slot number received from said telephone network.

18. The method of claim 17, further storing said slot number in a memory unit of said base station after said slot number has been identified from said telephone network.

* * * * *